United States Patent [19]

Yamakawa et al.

[11] Patent Number: 5,442,181
[45] Date of Patent: Aug. 15, 1995

[54] RADIATION DETECTOR AND ITS MANUFACTURING METHOD

[75] Inventors: Tsutomu Yamakawa, Tochigi; Keisei Shuto; Takuzou Takayama, both of Ootawara, all of Japan

[73] Assignee: Kabushiki Kaisha Toshiba, Kawasaki, Japan

[21] Appl. No.: 218,297

[22] Filed: Mar. 28, 1994

Related U.S. Application Data

[63] Continuation of Ser. No. 953,824, Sep. 30, 1992, abandoned.

[30] Foreign Application Priority Data

Oct. 3, 1991 [JP] Japan .................. 3-256643
Sep. 22, 1992 [JP] Japan .................. 4-253187

[51] Int. Cl.⁶ .............................................. G01T 1/202
[52] U.S. Cl. .................................................... 250/368
[58] Field of Search ........................................ 250/368

[56] References Cited

U.S. PATENT DOCUMENTS

| | | | |
|---|---|---|---|
| Re. 28,571 | 10/1975 | Lange | 250/366 |
| 4,029,964 | 6/1977 | Ashe | 250/368 |
| 4,284,891 | 8/1981 | Pergrale et al. | 250/363 |
| 4,311,907 | 1/1982 | Takami et al. | 250/368 |
| 4,516,025 | 5/1985 | Yamakawa et al. | 250/252.1 |
| 5,059,798 | 10/1991 | Persyk | 250/363.03 |
| 5,061,855 | 10/1991 | Ryuo et al. | 250/361 R |

FOREIGN PATENT DOCUMENTS

| | | |
|---|---|---|
| 0147561 | 7/1985 | European Pat. Off. . |
| 2641882 | 4/1977 | Germany . |
| 2934665 | 3/1980 | Germany . |

*Primary Examiner*—Constantine Hannaher
*Attorney, Agent, or Firm*—Oblon, Spivak, McClelland, Maier & Neustadt

[57] ABSTRACT

A radiation detector includes a plate-like monocrystal for converting a radiation ray radiated from an object to be examined to a visible ray, a glass plate provided on the monocrystal for transmitting the visible ray generated in the monocrystal and a plurality of photomultipliers arranged on the glass plate for converting the visible ray inputted through the glass plate from the monocrystal to an electrical signal.

18 Claims, 8 Drawing Sheets

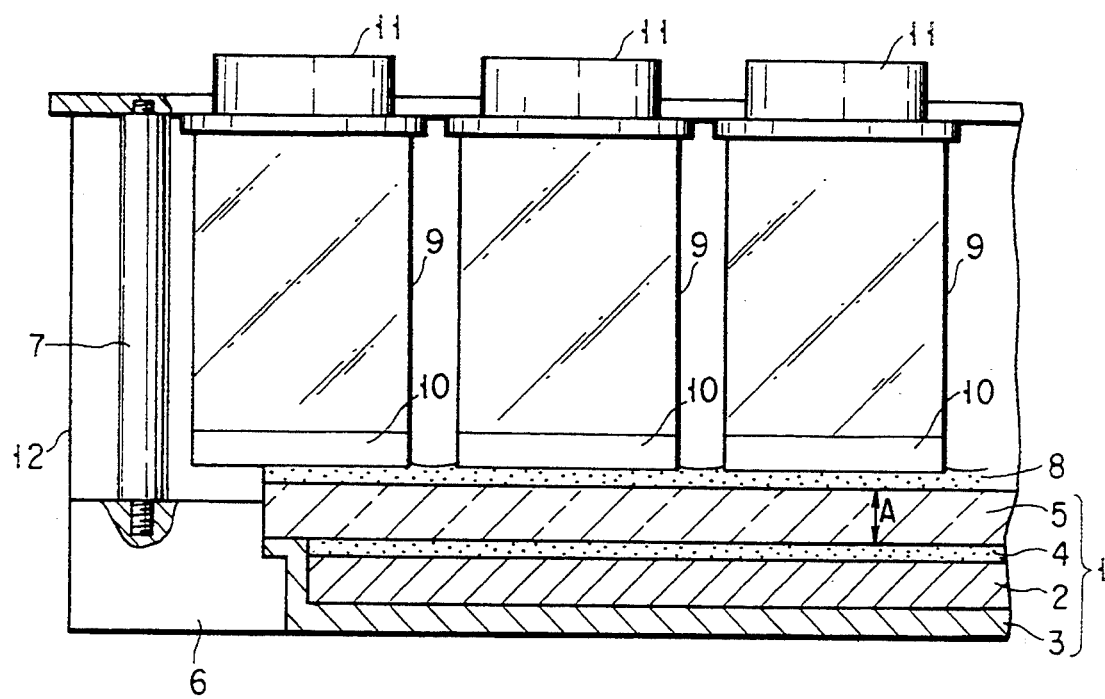
F I G. 2

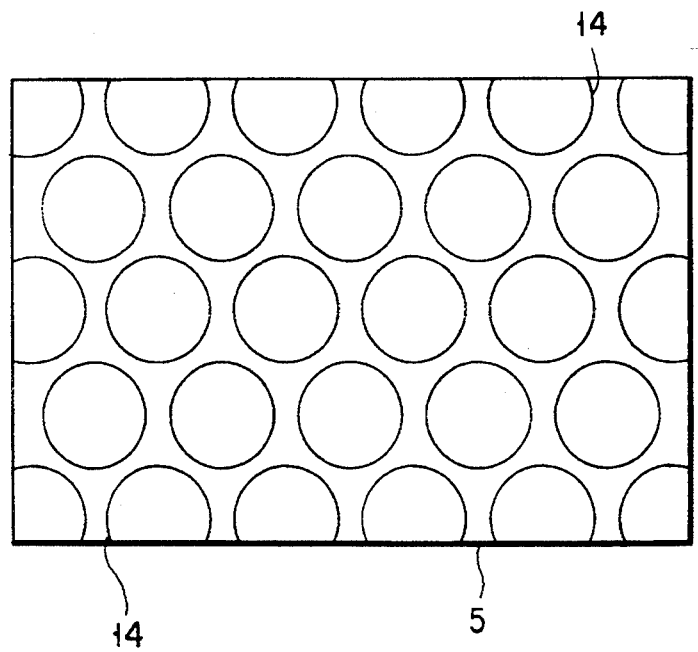
F I G. 6
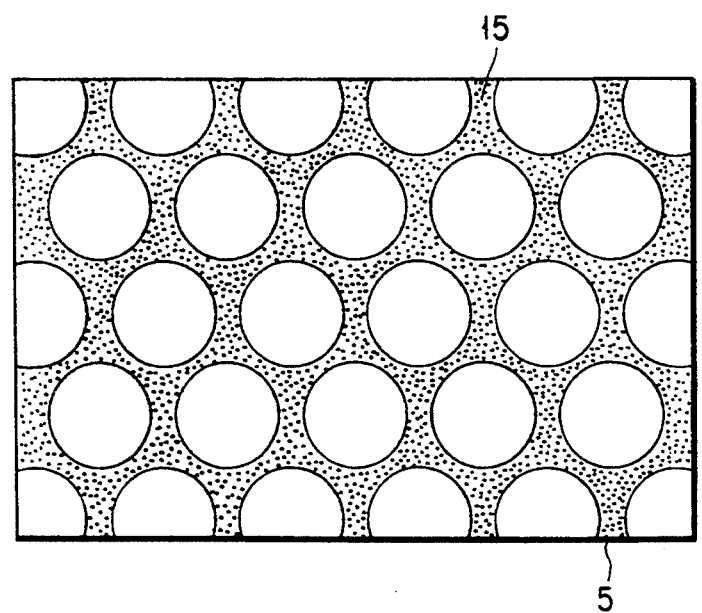
F I G. 7

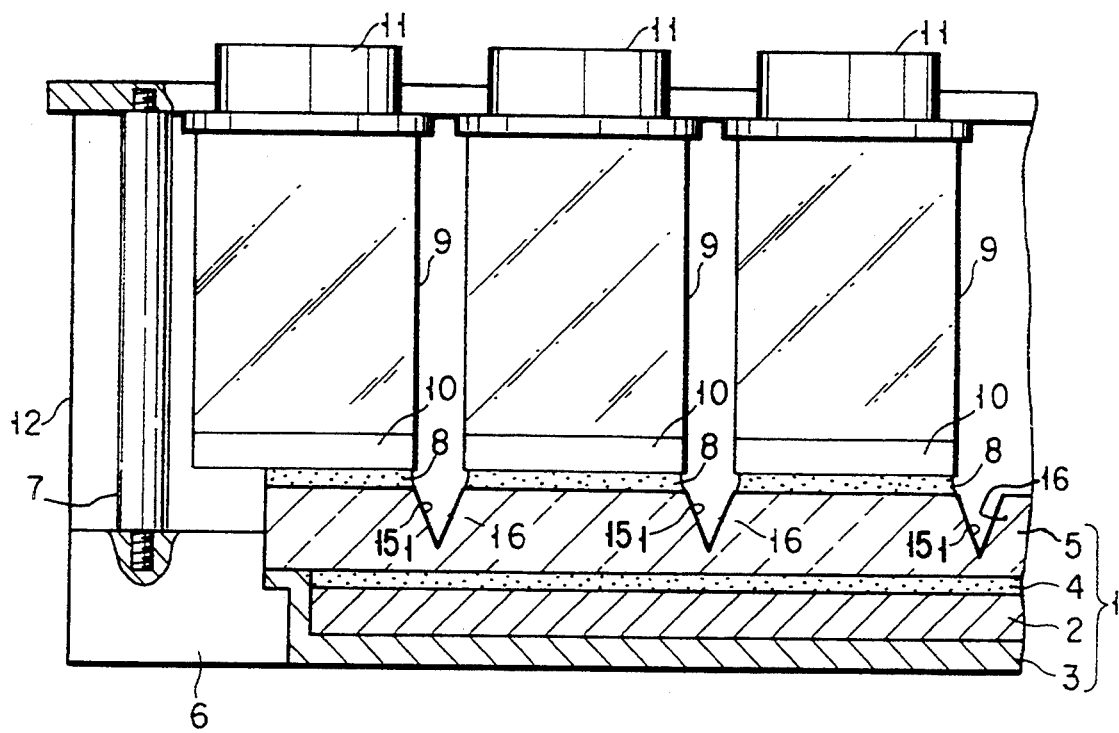
F I G. 8

RADIATION DETECTOR AND ITS MANUFACTURING METHOD

This application is a Continuation of application Ser. No. 07/953,824, filed on Sep. 30, 1992, now abandoned.

BACKGROUND OF THE INVENTION

1. Field of the Invention

The present invention relates to an improvement for a radiation detector to be used in a scintillation camera.

2. Description of the Related Art

If a radioactive medicine, which is labeled by radioisotope (hereinafter called "RI"), is added to a body, the radioactive medicine is absorbed in a specific organ or tissue, and concentrated thereon. By use of this property, a scintillation camera detects a γ-ray, which is emitted from the radioactive medicine at random, for a fixed period of time, and obtains an RI distribution (scintigram). This is useful for the diagnosis of the shape and function of the organ, an existence of a focus, and a metabolic function.

A conventional radiation detector of an Anger type used in the scintillation camera is structured as shown in FIG. 1. More specifically, a scintilator 30 comprises an aluminum plate 32 and a glass plate 34, and a flange 35 of an iron frame. The aluminum plate 32 is attached to a front surface (γ-ray incident surface) of a monocrystal 31. The monocrystal 31 is formed of sodium iodide (NaI) plate, and receives the γ ray, and emits a flash. The aluminum plate 32 protects the monocrystal 31 from deliquescence. The glass plate 34 is adhered to the back surface (output surface of scintillation light) of the monocrystal 31 by a silicon adhesive 33. The glass plate 34 protects the monocrystal 31 from deliquescence, and scintillation light is passed therethrough. The scintilator 30 is annularly formed by a flange 35 of an iron frame not to be deformed.

The conventional radiation detector is structured as follows.

A plurality of studs 44 are formed in the flange 35, so that the frame is formed. A light guide 37 of an acrylic plate is adhered to the glass plate 34 of the scintilator 30 by hard two-part liquid silicon 36. A plurality of photomultipliers 39 having a photoelectric surface 40 on the bottom of the light guide 37 are tightly arranged on the upper surface of the light guide 37 by a coupling agent 38 such as optical grease. The photomultipliers 39 are pressed to the light guide 37 and fixed thereto by a case 43 through a spring 42, which is inserted into a socket 41. The scintillation light, which is generated in the monocrystal 31, is passed through the adhesive 33, glass plate 34, two-part liquid silicon 36, light guide 37, coupling agent 38, and the outer tube of the photomultiplier 39 in order, and detected at the photoelectric surface 40. In an electric circuit of the scintillation camera, an output of each photomultiplier 39 of the radiation detector is received. An energy signal in which the output is added, that is, a signal, which is proportional to the whole amount of emitting light of scintillation light, is selected by a window, which is set in accordance with energy of the incident γ ray, so that only effective data is collected. Also, the output of the photomultiplier 39 is multiplied by a coefficient in accordance with the position of the arrangement, and added, so that the incident position of the γ ray is calculated and the RI distribution is outputted.

The conventional radiation detector has the structure in which a plurality of members such as the glass plate 34, the light guide 37, and the like are layered. Due to this, when scintillation light exceeds a critical angle and enters the portion between the members having a different refractive index, for example, a boundary surface between the glass plate 34 and silicon 36 or a boundary surface between the silicon 36 and the light guide 37, scintillation light totally reflects. Therefore, the components of the total reflection is increased as the scintillation position is away from the center of sensibility of the photomultiplier 39. Due to this, the change of sensibility, which is called a positional response of the photomultiplier, to the position of scintillation of the photomultiplier 39 is decreased as the γ ray enters the position, which is away from the center of sensibility. As a result, the electric circuit of the scintillation camera calculates the incident position of the γ ray in a state that the incident position is biased to the center of sensibility, and shows a tendency for a luminescent spot to be concentrated on the center of sensibility. Therefore, there is a disadvantage in that uniformity, which is one of the important basic performance features of the scintillation camera, is decreased.

In the conventional scintillation camera, the output of the photomultiplier is nonlinearly compensated in the electric circuit based on the positional response in which a point source is collected upon being moved on the surface of the scintilator, thereby a decrease in uniformity is controlled.

However, the compensation circuit is excessively loaded by such compensation, and other basic performances of the scintillation camera such as intrinsic resolving power and energy resolving power must be given up to some extent.

SUMMARY OF THE INVENTION

In consideration of the above problem, the present invention has been made, and a first object thereof is to provide a radiation detector wherein a positional response is improved by optical means, thereby the load to be applied to a nonlinear circuit can be reduced, and intrinsic resolving power and energy resolving power can be improved by improving uniformity. A second object is to simplify the structure of the radiation detector, thereby miniaturizing the detector, lightening the weight of the detector, and reducing the number of assembling steps.

A radiation detector of the present invention comprises a plate-like monocrystal converting a radiation ray radiated from an object to be examined to a visible ray, a glass plate, provided on the monocrystal, transmitting the visible ray generated in the monocrystal, and a plurality of photomultipliers, arranged on the glass plate, converting the visible ray inputted through the glass plate from the monocrystal to an electrical signal. Therefore, according to the radiation detector of the present invention, since scintillation light reaches to the photomultiplier through only the glass plate member, unlike the conventional invention, no component of total reflection is generated at the boundary surface between the glass plate and the light guide, and the positional response can be improved. As a result, uniformity can be improved and intrinsic resolving power and energy resolving power can be improved at the same time.

The other radiation detector of the present invention comprises a plate-like monocrystal converting a radiation ray radiated from an object to be examined to a visible ray, a transmission member, provided on the monocrystal, transmitting the visible ray generated in the monocrystal, an adhesive having substantially the same refractive index as that of the transmission member and adhering the transmission member to the monocrystal, and a plurality of photomultipliers, arranged on the transmission member, converting the visible ray inputted through the glass plate from the monocrystal to an electrical signal. Therefore, according to the other radiation detector of the present invention, since scintillation light reaches to the photomultiplier through the adhesive having substantially the same refractive index as that of the transmission member and the transmission member in order, unlike the conventional invention, no component of total reflection is generated at the boundary surface between the adhesion having a different refractive index and the light guide, and the positional response can be improved. As a result, uniformity can be improved and intrinsic resolving power and energy resolving power can be improved at the same time.

The other radiation detector of the present invention comprises a plate-like monocrystal converting a radiation ray radiated from an object to be examined to a visible ray, a transmission member, provided on the monocrystal, transmitting the visible ray generated in the monocrystal, and a plurality of photomultipliers, arranged on the transmission member, receiving the visible ray inputted through the transmission member from the monocrystal at a photoelectric surface formed from the front surface to the side surface and converting the ray to an electrical signal. Therefore, according to the other radiation detector of the present invention, since scintillation light reaching to the side surface of the photomultiplier can be detected, the positional response can be improved. As a result, uniformity can be improved and intrinsic resolving power and energy resolving power can be improved at the same time.

Moreover, according to the method for manufacturing the radiation detector of the present invention, there is provided a method for manufacturing a radiation detector comprising the steps of adhering a transmission member transmitting a visible ray to a plate-like monocrystal converting a radiation ray radiated from an object to be examined to the visible ray by an adhesive having substantially the same refractive index as the transmission member, arranging a plurality of photomultipliers, converting the visible ray to an electrical signal, on the transmission member, and adhering the photomultipliers to the transmission member by an adhesive having substantially the same refractive index as that of at least one of the photomultiplier and the transmission member. Therefore, according to the manufacturing method of the radiation detector of the present invention, since it is unnecessary to take time to provide a spring or further mount the light guide on the glass plate provided on the monocrystal, the number of assembling steps can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross sectional view showing a radiation detector according to a first embodiment of the present invention;

FIG. 6 is a plan view of a glass plate according to a third embodiment of the present invention;

FIG. 7 is a plan view of a glass plate according to a fourth embodiment of the present invention;

FIG. 8 is a cross sectional view showing a radiation detector according to a fifth embodiment of the present invention.

DESCRIPTION OF THE PREFERRED EMBODIMENTS

Figure 1:
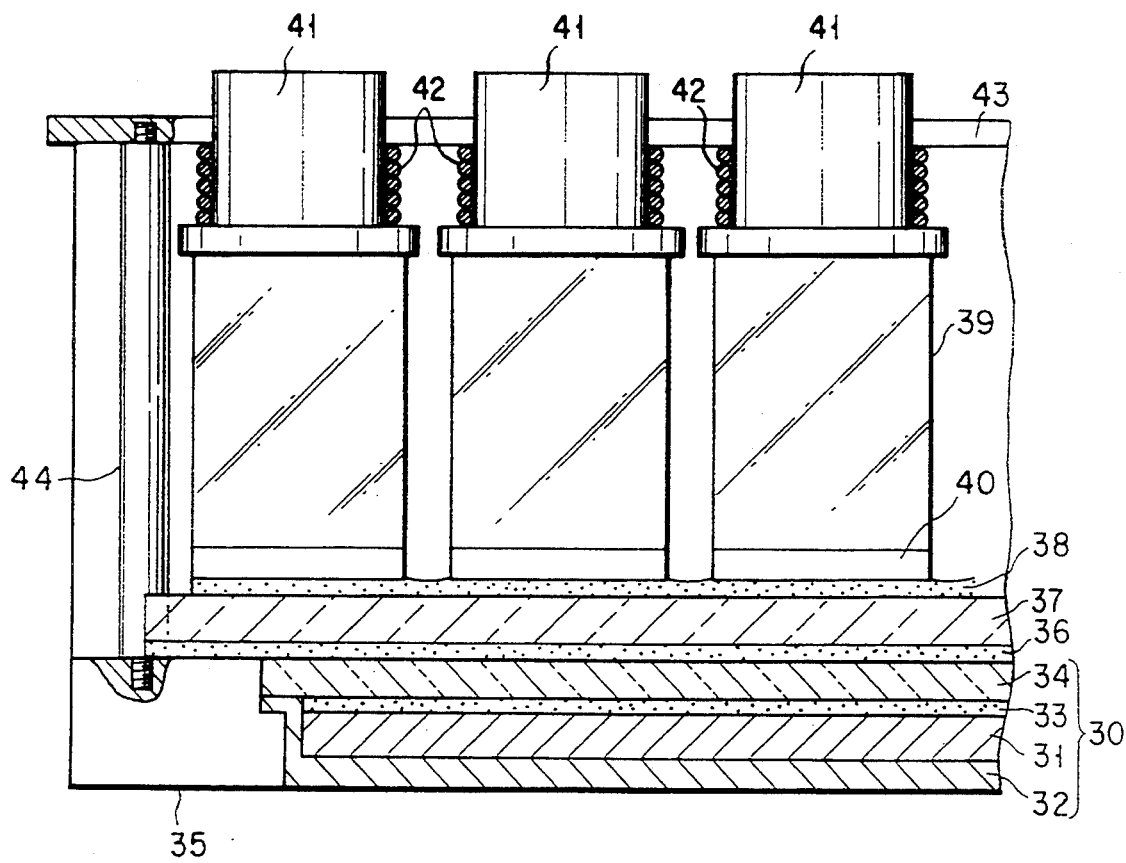
FIG. 1 is a cross sectional view showing a conventional radiation detector.

Embodiments of the present invention will now be explained with reference to the drawings.

FIG. 2 shows the first embodiment of the present invention. More specifically, a scintillator 1 is structured as follows.

An aluminum plate 3 is attached to a front surface (γ-ray incident surface) of a monocrystal 2. The monocrystal 2 is formed of sodium iodide (NaI) plate, receives a γ ray, and emits a flash. The aluminum plate 3 protects the monocrystal 2 from deliquescence. A glass plate 5 having a thickness of 9–16 mm is formed on the back surface (output surface of scintillation light) of the monocrystal 2 in accordance with the total thickness of the glass plate and the light guide of the conventional scintilator. Then, the portion between the monocrystal 2 and the glass plate 5 is filled with an acrylic adhesive 4 having substantially the same refractive index as that of the glass plate 5 (for example, 1.51). Since the glass plate 5 has the above-mentioned thickness, the glass plate 5 not only protects the monocrystal 2 from deliquescence but also functions as a light guide. The scintillator 1 is annularly formed by a flange 6 of an iron frame not to be deformed.

Figure 3:
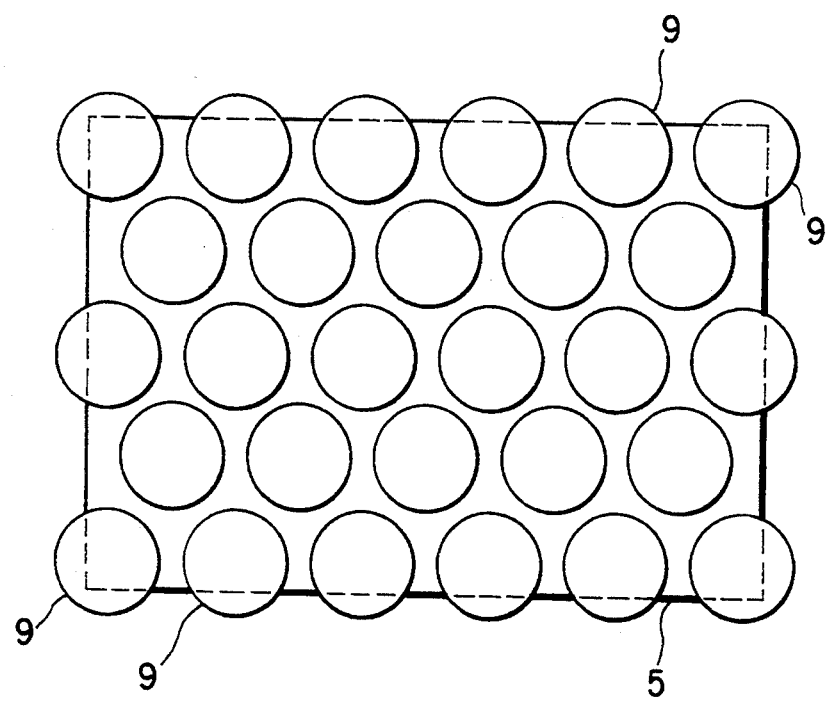
FIG. 3 is a plan view showing the arrangement of photomultipliers.

According to the radiation detector of the present invention, a plurality of studs 7 are formed in the flange 6, so that the frame is formed. As shown in FIG. 3, a plurality of photomultipliers 9 having a photoelectric surface 10 on the bottom are tightly arranged on the glass plate 5 of the scintillator 1, and the photomultipliers 9, which are provided at the most end portions, are arranged on the glass plate 5 in an overhanging state. The portions between the glass plate 5 and the photomultipliers 9 are filled with an acrylic adhesive 8 having substantially the same refractive index as that of at least one of the glass plate 5 and the outer tube (borosilicate glass or potassium free glass is generally used) of the photomultipler 9, and adhered. Then, the scintilator 1 and the photomultipliers 9 are contained in a case 12 constituting a dark box and a magnetic screen box.

According to the above-structured radiation detector of the present invention, the following technical advantages can be realized.

Figure 4:
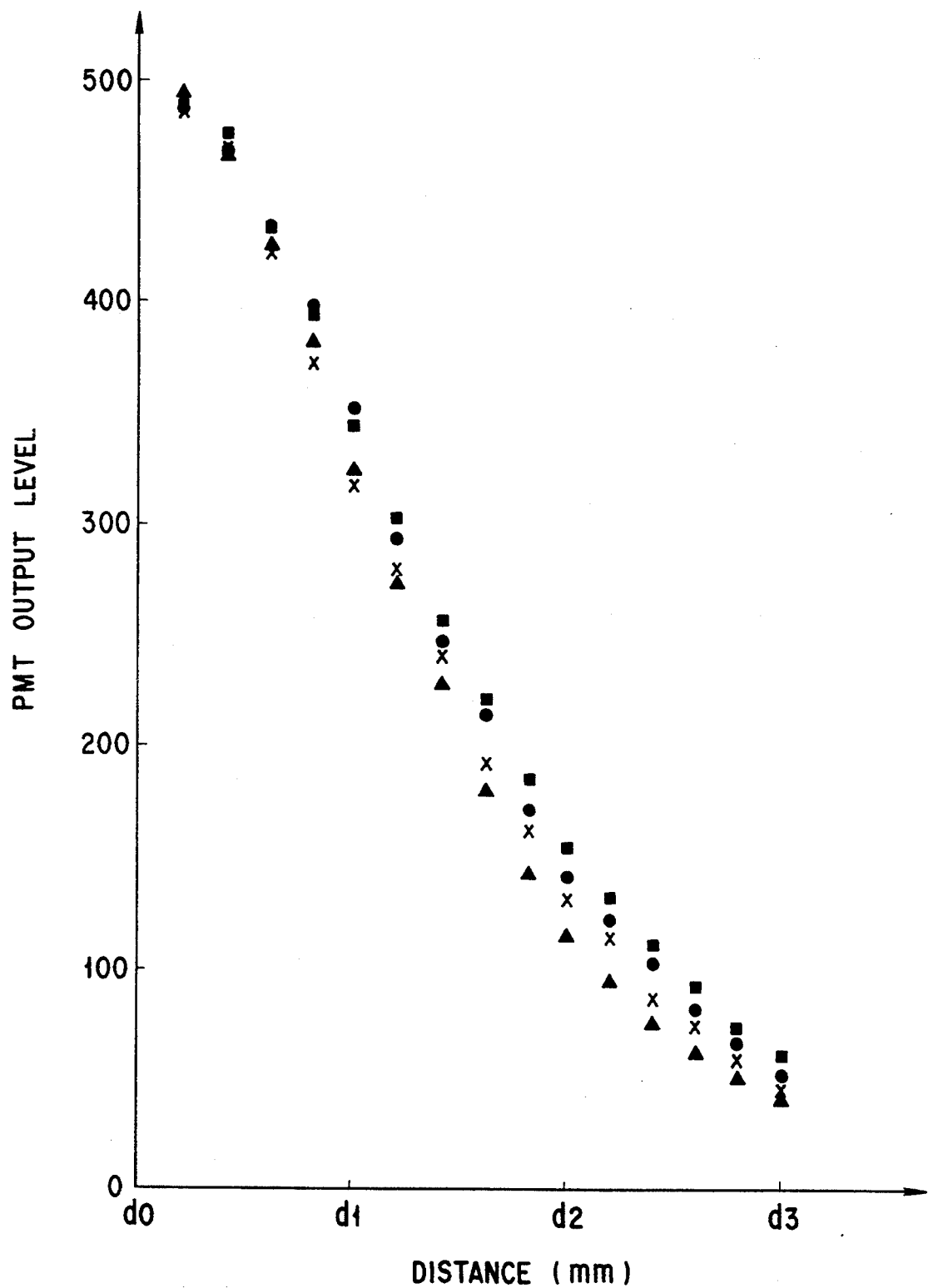
FIG. 4 is a view showing a characteristic of a positional response.

First, scintillation light, which is generated in the monocrystal 2, is passed through the adhesive 4 having substantially the same refractive index as that of the glass plate 5, the glass plate having a predetermined thickness, the adhesive 8 having substantially the same refractive index as that of at least one of the glass plate 5 and the outer tube of the photomultipler 9 in order and reaches to the photoelectric surface 10 of the photomultiplier 9. Therefore, any optical loss is extremely small. In other words, since the total reflection of scintillation light, which is generated in the portion between the members having the different refractive index, the portion between the monocrystal and the adhesive, the portion between the adhesive and the glass plate, the portion between the glass plate and a silicon adhesive, the portion between the silicon adhesive and the light guide, the portion between the light guide and a coupling agent, and the portion between the coupling agent and the photomultiplier, is decreased, a characteristic of sensibility to the scintillation position of the photomultipler, that is, the characteristic of a positional response is improved. FIG. 4 is a view showing a characteristic of a positional response wherein a vertical axis is an output level of the photomultiplier, a horizontal axis is a distance from the center d0 of sensibility of the photomultiplier, shows the prior art, and X shows the present embodiment but adopting a silicon adhesive between the monocrystal 2 and the glass plate 5 instead of the acrylic adhesive 4. As a result, the load to be applied to a nonlinear circuit can be reduced, and the intrinsic resolving power and energy resolving power can be improved so as to improve uniformity. The specific measured value showing improvement of the positional resolving power and energy resolving power are FWHM 0.2 mm or more of positional resolving power and 0.8% or more of energy resolving power.

According to this embodiment, since the characteristic of the positional response is good, the positional resolving power and energy resolving power can be maintained to the same extent as the conventional case even if the spacing of the next photomultipliers is extended. Therefore, in this case, it is possible to provide a radiation detector whose maintenance is simply performed at low cost.

Second, the photomultipliers 9, which are arranged at the extreme end portions, are held on the glass plate 5 in an overhanging state. Thereby, the photomultipliers 9 can be arranged in a wide range, which is more than the incident area of the monocrystal 2, and distortion of an image of the peripheral portion of the monocrystal 2 can be reduced.

Third, the photomultipliers 9, which are arranged at the extreme end portions, are held on the glass plate 5 in an overhanging state. Thus, there is no need to change the size of the area of the glass plate 5 or to fill a light guide on the glass plate 5. As a result, the conventional flange 6 is used as is, and the detector can be prevented from being enlarged.

Fourth, since the detector of the present invention has the simple structure in which the conventional acrylic plate and the conventional spring are removed, the detector can be thinner and lighten, and the number of assembling steps can be reduced.

A second embodiment of the present invention will now be explained.

Figure 5:
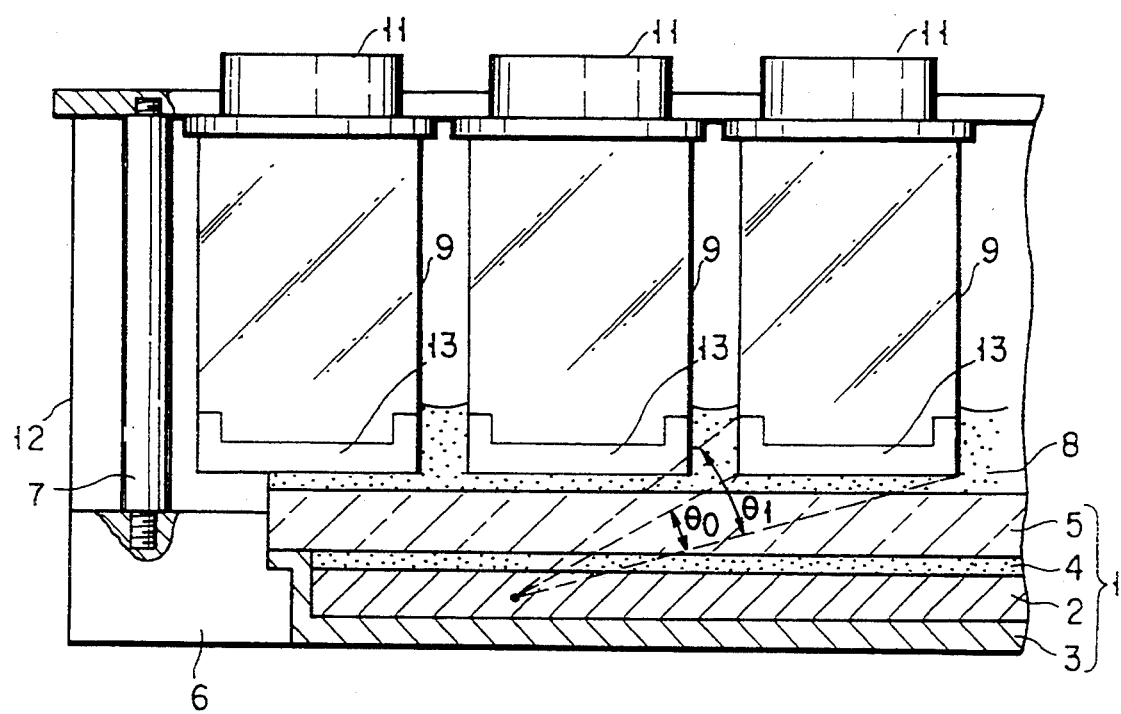
FIG. 5 is a cross sectional view showing a radiation detector according to a second embodiment of the present invention.

FIG. 5 is a cross sectional view showing the structure of the second embodiment. It is noted that the same reference numerals are used to refer to the same portions as the first embodiment of FIG. 2, and a specific explanation thereof is omitted.

In the first embodiment, the photoelectric surface 10 is formed on only the bottom surface of the outer tube of the photomultipler 9. However, in the second embodiment, a photoelectric surface 13 is formed, which extends from the bottom surface of the outer tube of the photomultipler 9 to the side surface thereof, and which has a height of 3–10 mm. Also, the acrylic adhesive 8 is packed up to the side surface of the photoelectric surface 13.

Therefore, as shown in FIG. 5, the photomultiplier 9 can detect scintillation light with a light receiving angle $\theta 1$, which is wider than the conventional light receiving angle $\theta 0$, so that the positional response, which is better than the first embodiment, can be realized as shown in FIG. 4. It is noted that is FIG. 4 ▲ shows the prior art and ■ shows this embodiment but adopting a silicon adhesive between the monocrystal 2 and the glass plate 5 instead of the acrylic adhesive 4.

Additionally, according to this embodiment, even if the acrylic adhesive 8 is packed in only the bottom surface of the photomultiplier 9 similar to the first embodiment without packing the adhesive 8 up to the side surface of the photoelectric surface 13, the positional response, which is better than the first embodiment, can be realized as shown by ● in FIG. 4.

A third embodiment of the present invention will now be explained.

FIG. 6 is a plan view showing the glass plate according to the third embodiment of the present invention. It is noted that the entire structure of the radiation detector of this embodiment is the same as that of the first embodiment of FIG. 1.

This embodiment is characterized in that a ring-shaped marking 14, which shows the position where the photomultipler 9 is arranged on the upper surface of the glass plate 5 of the scintilator 1.

Therefore, since the marking 14 may be used when the photomultiplier 9 is arranged on the glass plate 5, assembly can be correctly and efficiently performed.

A fourth embodiment of the present invention will now be explained.

FIG. 7 is a plan view showing the glass plate according to the fourth embodiment of the present invention. It is noted that the entire structure of the radiation detector of this embodiment is the same as that of the first embodiment of FIG. 1.

This embodiment is characterized in that coating material 15 containing a reflection agent is applied to a portion (slanted lines) where no photomultipler 9 is arranged on the upper surface of the glass plate 5 by silk printing.

Therefore, according to this embodiment, the photomultiplier 9 can detect scintillation light well, so that the positional response can be improved.

A fifth embodiment of the present invention will be explained.

FIG. 8 is a cross sectional view showing the structure of the fifth embodiment. It is noted that the same reference numerals are added to the same portions as the first embodiment of FIG. 2, and thus a specific explanation thereof is omitted.

This embodiment is characterized in that the portion where no photomultiplier 9 is arranged on the the upper surface of the glass plate 5 is cut in a section-V form, and a seating 16, which receives the photomultiplier 9, is formed on the upper surface of the glass plate 5. The surface $15_1$ of the cut is coated by a reflection agent.

Therefore, according to the fifth embodiment, the seating 16 may be used when the photomultiplier 9 is arranged on the upper surface of the glass plate 5. Also, the use of the seating 16 is useful for thinning the thickness of the glass plate 5 and reducing the number of photomultipliers 9.

A sixth embodiment of the present invention will now also be explained.

Figure 9A:
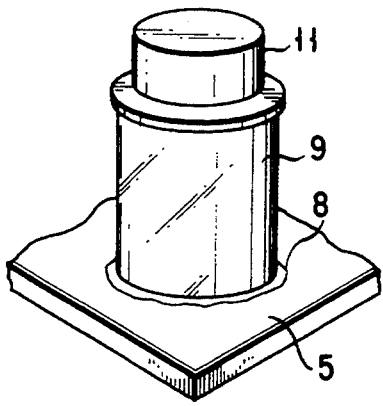
FIGS. 9A to 9E are views showing the steps of detaching a photomultiplier from a glass plate according to a sixth embodiment of the present invention.
Figure 9B:
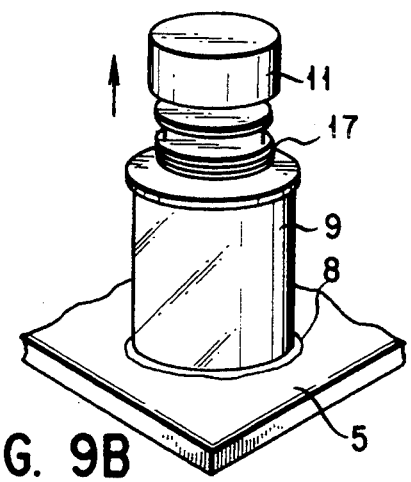
Figure 9D:
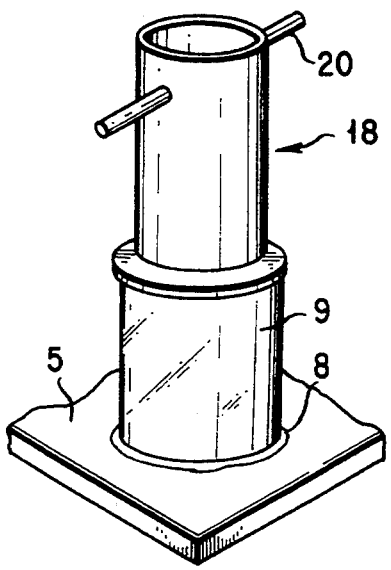
Figure 9C:
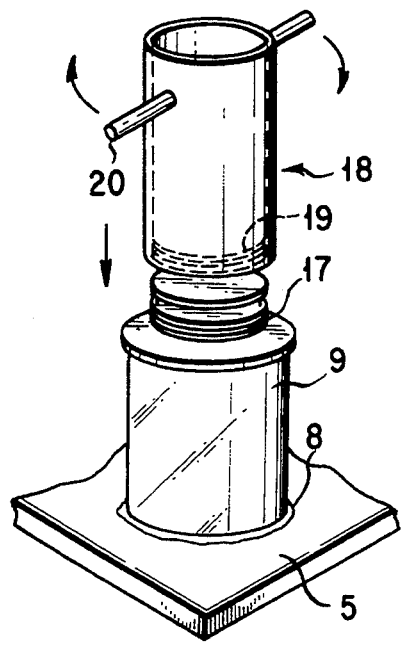
Figure 9E:
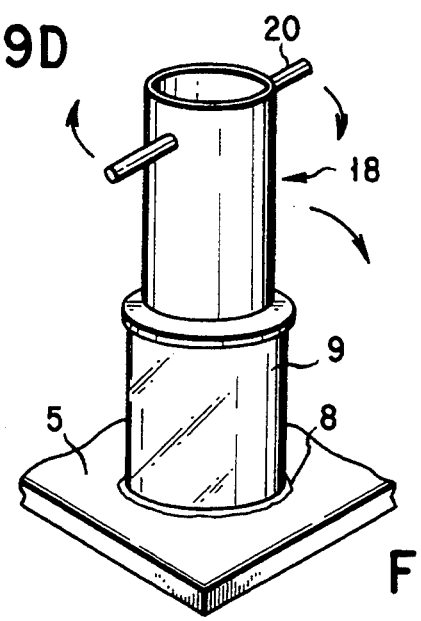

This embodiment relates to a jig, which is used when the photomultiplier 9 is detached from the glass plate 5, and its detaching method. FIGS. 9A to 9E are views showing the steps of detaching the photomultiplier from the glass plate by the jig. According to this embodiment, a socket 11, which is screwed to a screw thread 17 of the photomultiplier 9, is detached as shown in FIGS. 9A and 9B. Then, as shown in FIGS. 9C and 9D, a jig 18 for detachment in place of the socket 11 is screwed to the screw thread 17. The jig 18 is a cylinder in which a screw thread 19 is screwed to the inner wall of one side, and a handle 20 is fixed to the other side. Then, the jig 18 is held and the photomultiplier 9 is rotated or inclined on the glass plate 5. As a result, the acrylic adhesive 8 is peeled from the photomultiplier 9 and the glass plate 5, so that the photomultiplier 9 can be easily detached from the glass plate 5. After detaching the photomultiplier 9 from the glass plate 5, the surface of the glass 5 is cleaned by alcohol, and another photomultiplier 9 is adhered to the glass 5 by the acrylic adhesive 8.

According to this embodiment, since the photomultiplier 9 can be easily detached from the glass plate 5, the exchange of a photomultiplier 9 experiencing problem can be easily performed. It is noted that rubber having a high coefficient of friction is formed in the inner wall of the cylinder without forming the screw thread 19, and the jig may be attached to the photomultiplier 9 by frictional force of rubber.

The present invention is not limited to the above-mentioned embodiments, and various modifications may be worked.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A radiation detector comprising:
   a scintillator having a plate-like monocrystal converting a radiation ray radiated from an object to be examined to a visible ray, and a glass plate provided on said monocrystal, said glass plate transmitting said visible ray generated in said monocrystal, and protecting said monocrystal from deliquescence wherein said glass plate has a thickness of 9 mm or greater;
   a plurality of photomultipliers, arranged on said glass plate of said scintillator, converting the visible ray to an electrical signal; and
   a filling agent packed between said photomultipliers and said glass plate of said scintillator, and having substantially the same refractive index as that of an input surface of said photomultipliers and that of said glass plate.

2. The radiation detector according to claim 1, further comprising a filling agent packed in a portion between said monocrystal and said glass plate, and having substantially the same refractive index as that of said glass plate.

3. The radiation detector according to claim 1, wherein said filling agent adheres said photomultiplier to said glass plate.

4. A radiation detector comprising:
   a plate-like monocrystal for converting a radiation ray radiated from an object to be examined to a visible ray;
   a transmission member provided on said monocrystal for transmitting said visible ray generated in said monocrystal; and
   a plurality of photomultipliers, arranged on said transmission member, for converting the visible ray inputted through said transmission member from said monocrystal to an electrical signal, wherein at least one of said photomultipliers is arranged to hang over an edge of said transmission member.

5. A radiation detector comprising:
   a scintillator having a plate-like monocrystal converting a radiation ray radiated from an object to be examined to a visible ray, and a glass plate transmitting said visible ray, and protecting said monocrystal from deliquescence wherein said glass plate has a thickness of 9 mm or greater;
   an adhesive having substantially the same refractive index as that of said glass plate of said scintillator and adhering said glass plate to said monocrystal; and
   a plurality of photomultipliers, arranged on said glass plate of said scintillator, said photomultipliers converting the visible ray to an electrical signal.

6. A radiation detector, comprising:
   a plate-like monocrystal converting a radiation ray radiated from an object to be examined to a visible ray;
   a glass plate transmitting said visible ray;
   an adhesive having substantially the same refractive index as that of said glass plate, said adhesive adhering said glass plate to said monocrystal; and
   a plurality of photomultipliers, arranged on said glass plate, said photomultipliers converting the visible ray inputted through said glass plate from said monocrystal to an electrical signal, wherein at least one of said photomultipliers is arranged to hang over an edge of said glass plate.

7. The radiation detector according to claim 6, wherein said adhesive is an acrylic adhesive.

8. The radiation detector according to claim 6, further comprising an adhesive separably adhering said photomultiplier to said glass plate.

9. The radiation detector according to claim 6, wherein said glass plate is a single glass.

10. The radiation detector according to claim 6, further comprising an adhesive having substantially the same refractive index as that of an input surface of said photomultiplier, and adhering said photomultiplier to said glass plate.

11. The radiation detector according to claim 6, further comprising an adhesive having substantially the same refractive index as that of said glass plate, and adhering said photomultiplier to said glass plate.

12. The radiation detector according to claim 6, wherein said glass plate has a thickness of 9 mm or greater.

13. A radiation detector comprising:
a scintillator having a plate-like monocrystal for converting a radiation ray radiated from an object to be examined to a visible ray, and a glass plate provided on said monocrystal and transmitting said visible ray, said glass plate protecting said monocrystal from deliquescence;
a plurality of photomultipliers, arranged on said glass plate of said scintillator, said photomultipliers receiving said visible ray at a photoelectric surface formed from the front to the side, and converting said visible ray to an electrical signal, said photomultipliers being buried along side surfaces thereof at least up to the extent of said photoelectric surface by a filling agent having substantially the same refractive index as that of at least one of said photomultipliers and that of said glass plate of said scintillator.

14. The radiation detector according to claim 13, further comprising an adhesive having substantially the same refractive index as that of an input surface of said photomultiplier and that of said glass plate, and adhering said photomultiplier to said glass plate of said scintillator.

15. The radiation detector according to claim 13, further comprising an adhesive having substantially the same refractive index as that of said glass plate of said scintillator, and adhering said glass plate to said monocrystal.

16. The radiation detector according to claim 13, wherein said glass plate of said scintillator has a thickness of 9 mm or greater.

17. The radiation detector according to claim 13, further comprising an adhesive separably adhering said photomultiplier to said glass plate.

18. A method for manufacturing a radiation detector comprising the steps of:
arranging a plurality of photomultipliers, which convert a visible ray to an electrical signal, on a scintillator, said scintillator having a plate-like monocrystal which converts a radiation ray radiated from an object to be examined to said visible ray, and a glass plate which transmits said visible ray to said plurality of photomultipliers, said glass plate having a thickness of 9 mm or greater, adhered on said plate-like monocrystal by using an adhesive having substantially the same refractive index as that of said glass plate; and
adhering said plurality of photomultipliers to said scintillator by an adhesive having substantially the same refractive index as that of said plurality of photomultipliers and that of said glass plate.

* * * * *